US009651065B2

(12) United States Patent
Zipperer et al.

(10) Patent No.: US 9,651,065 B2
(45) Date of Patent: May 16, 2017

(54) METHOD FOR OPERATING A MECHANICAL SYSTEM, PARTICULARLY A PROPORTIONING VALVE

(75) Inventors: Martin Zipperer, Reutlingen (DE); Winfried Moser, Ludwigsburg (DE); Klaus-Peter Schnelle, Ditzingen (DE); Steffen Schumacher, Renningen (DE); Lothar Krauter, Bietigheim-Bissingen (DE); Rene Deponte, Weil Im Schoenbuch (DE); Christof Ott, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1408 days.

(21) Appl. No.: 12/774,473

(22) Filed: May 5, 2010

(65) Prior Publication Data
US 2010/0286832 A1 Nov. 11, 2010

(30) Foreign Application Priority Data

May 6, 2009 (DE) .................. 10 2009 002 852

(51) Int. Cl.
| | |
|---|---|
| F16H 21/44 | (2006.01) |
| G05D 17/00 | (2006.01) |
| F15B 13/044 | (2006.01) |
| G05D 19/02 | (2006.01) |
| F15B 13/04 | (2006.01) |

(52) U.S. Cl.
CPC ........ *F15B 13/044* (2013.01); *F15B 13/0402* (2013.01); *G05D 19/02* (2013.01); *F15B 2211/7733* (2013.01); *Y10T 74/18888* (2015.01)

(58) Field of Classification Search
None
See application file for complete search history.

(56) References Cited

U.S. PATENT DOCUMENTS

| | | | | |
|---|---|---|---|---|
| 5,273,348 | A | * 12/1993 | Yagi et al. | ...................... 303/13 |
| 7,154,326 | B2 | * 12/2006 | Swanson et al. | ............. 327/427 |
| 2008/0099706 | A1 | * 5/2008 | Cook et al. | ............. 251/129.01 |

FOREIGN PATENT DOCUMENTS

| | | |
|---|---|---|
| DE | 103 04 711 | 8/2004 |
| DE | 103 15 152 | 10/2004 |

* cited by examiner

*Primary Examiner* — Sean Shechtman
(74) *Attorney, Agent, or Firm* — Norton Rose Fulbright US LLP

(57) ABSTRACT

A mechanical system has a component, which is movable under friction. An oscillating micromotion (dither) is impressed upon the component, which, if necessary, is added to a non-oscillating base motion of the component. It is provided that the micromotion (without the base motion that is additional, if necessary) is faster within a period of the oscillation in the one direction and is of shorter duration than in the opposite direction (asymmetrical dither).

7 Claims, 4 Drawing Sheets

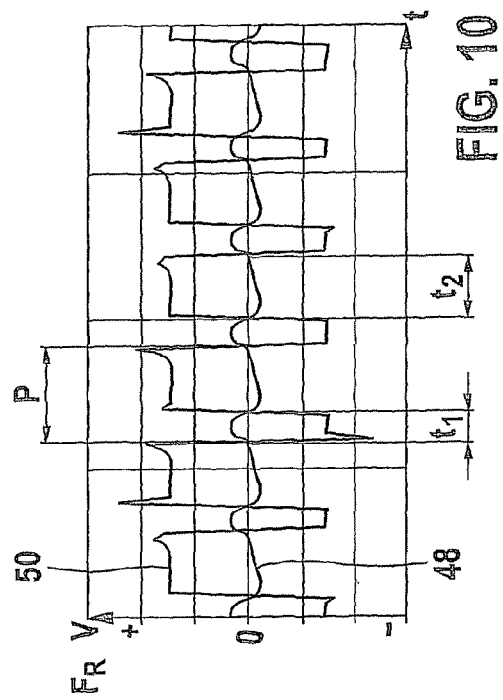
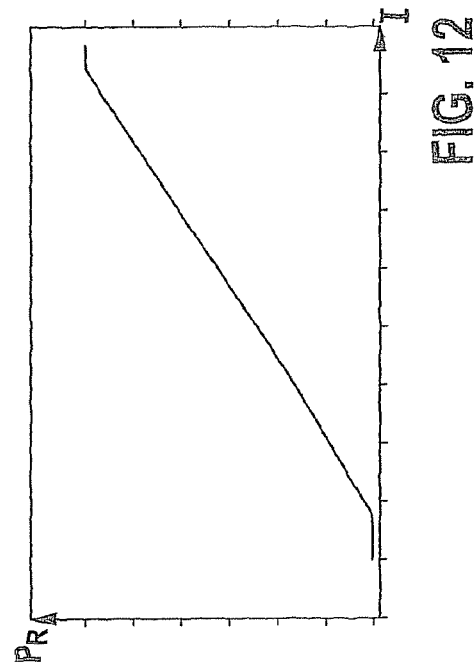
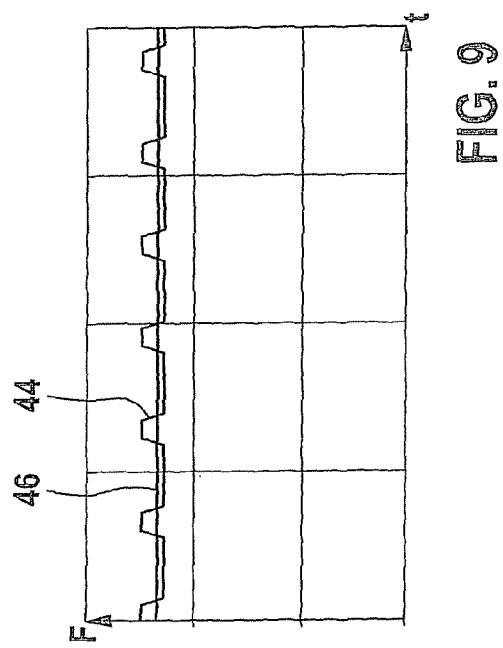
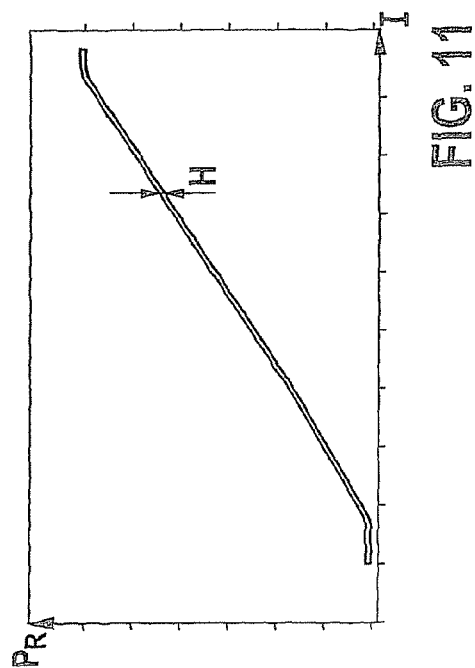

METHOD FOR OPERATING A MECHANICAL SYSTEM, PARTICULARLY A PROPORTIONING VALVE

RELATED APPLICATION INFORMATION

The present application claims priority to and the benefit of German patent application no. 10 2009 002 852.8, which was filed in Germany on May 6, 2009, the disclosure of which is incorporated herein by reference.

FIELD OF THE INVENTION

The present invention relates to a method for operating a mechanical system. The subject matter of the present invention also relates to a computer program, an electrical storage medium as well as a control and/or regulating device.

BACKGROUND INFORMATION

It is understood that, in mechanical systems, in the case of two components which are movable relative to each other under friction, a frictional force directed counter to the direction of motion occurs when the components are moved relative to each other. In many mechanical systems, this frictional force may act interferingly, since it may prevent a clear stationary state from setting in. In addition, it leads to hysteresis in response to reversing motional sequences and to a so-called "stick-slip behavior".

From this it is also known that, for the reduction or even prevention of these effects, the material pairings and/or the surface treatments of the two components ("friction partners") may be matched so that their coefficient of static friction and coefficient of sliding friction is minimized. Appropriate lubricants are also used, in order to reduce the frictional force. Lastly, it is also known that one may generate a micromotion modulated upon the base motion of a friction partner, in order to maintain the mechanical systems, according to the so-called "Stribeck curve", durably in sliding friction, instead of intermittently in sliding friction and in static friction. Such an oscillating micromotion is called "dither". The dither known up to now is symmetrical, that is, the two half-waves within a period of oscillation do have opposite signs, but are otherwise identical. Such a symmetrical, and thus average-free dither is used, for instance, in controlling an electromagnetically operated proportioning valve, which is used in automatic transmissions of motor vehicles. It is ensured thereby that the transmission characteristic pressure/current is not corrupted and that the pressure/current hysteresis is reduced.

German document DE 103 15 152 A1 discusses a method for controlling an electromagnetically operated valve using a pulse width modulated signal whose period duration depends upon the valve current or an "on" portion of the control signal. German patent document DE 103 04 711 B4 discusses a similar method, in which the pulse frequency of the control signal is a function of a valve current and/or a supply voltage of the electromagnetic valve.

SUMMARY OF THE INVENTION

It is an object of the exemplary embodiments and/or exemplary methods of the present invention to improve the behavior of the mechanical system.

This object is attained by a method having the features described herein. Further design approaches are named in the alternative independent claims. Advantageous refinements of the exemplary embodiments and/or exemplary methods of the present invention are further described herein. In addition, the following description and the drawings also describe features which are able to be important for the exemplary embodiments and/or exemplary methods of the present invention both by themselves and in different combinations, without this being explicitly pointed out in each case.

According to the exemplary embodiments and/or exemplary methods of the present invention, the symmetry of the dither is left behind, and instead, an asymmetrical dither is used whose half-waves differ within one period with respect to duration and absolute value. By doing this, a frictional force directed in a desired manner is generated, in connection with the Stribeck curve which characterizes the frictional response of the movable components. Such a specifically generated, directed frictional force may be used in the most varied manner for influencing the behavior of the mechanical system. For example, the basic motion of the component may first be generated at all by the asymmetrical dither. The frictional force directed in a desired manner may, however, also be used as a "force booster" for supporting an outer overall force acting on the component. The method according to the present invention is quite especially helpful, however, for the reduction in the hysteresis effects that may occur in response to the motion of a component between a motion in the one direction and a motion in the opposite direction. In this context, one may utilize the fact that the asymmetrical dither according to the present invention generates a frictional force that acts on the mechanical systems in a damping, and thus stabilizing manner.

It is understood, in this context, that the amplitude of the micromotion is sufficiently great so that the effect is really noticeable, and static friction is overcome in the zero crossing of the motion (speed zero). Since the method according to the present invention only works when there is friction, the latter should be explicitly provided, if necessary, for instance, in a system that is otherwise extremely lacking in friction.

A first, particularly advantageous embodiment of the method, according to the present invention, stands out in that the integral of the speed of the micromotion, or a corresponding control variable, is at least approximately the same in absolute value in the one direction as well as in the other direction, over the time within one period of the oscillation. It should be pointed out at this time that the features just pointed out do not necessarily mean that the speed is set directly in the desired way. In most application cases this would rather not come into consideration because of the additional measuring effort. Instead, this embodiment is implemented in most cases in that a setpoint or actual drive current is set, and the corresponding integral is set to zero. This has the effect that the dither, in spite of its asymmetry, is "average-free", by which one should understand that the non-oscillating base motion of the component is not influenced in absolute value by the asymmetrical dither, when an average is formed over at least one period. The control or regulation of the non-oscillating base motion of the component is thereby clearly simplified, since the transmission behavior between the base control signal and the non-oscillating base motion is not corrupted or interfered with.

It is further provided that an absolute value of a frictional force, that is generated by the asymmetrical dither, is a function of a current setpoint operating variable and/or a current actual operating variable of the mechanical system. Because of the dependence named, the absolute value of the directed frictional force may be adjusted optimally for each operating point of the mechanical system.

Something similar is also possible for the direction of the frictional force that is generated by the asymmetrical dither. Hereby, too, one may optimally adjust the behavior of the mechanical system for each operating point of the mechanical system. For example, the direction of the frictional force may be inverted on the time axis by taking the mirror image of the speed curve corresponding to the dither signal causing it.

From a control technology point of view, it is comparatively easy to generate the asymmetrical dither by a rectangular control signal. The equalization, mentioned above, of the integral of the speed of the micromotion and of the control variable over time, within one period of the oscillation in the one direction, to that in the other direction is particularly simple, especially in such a case. The absolute value of the frictional force may be adjusted by the ratio, also known as duty cycle, of the "on" portion of a high level of the rectangular signal to the reciprocal value of the frequency of the rectangular signal (dither frequency).

One case of application, in which the advantages of the method according to the present invention are particularly significant, is a mechanical system in which the component is moved using an electromagnetic operating device. In such a mechanical system, conditioned on principle, there is always a magnetic hysteresis which is almost completely able to be compensated for by the method according to the present invention. The motion, or rather positioning of the component using an electromagnetic operating device is therefore especially precise when the method according to the present invention is used.

This applies all the more if the mechanical system is a valve, especially a proportioning valve, and the movable component is a valve element. When applying the method according to the present invention, it is not only possible to reduce a pressure/current hysteresis somewhat, but it may be removed practically completely. The setting of a desired pressure or of a desired volumetric flow current is thus possible at very high precision.

Exemplary specific embodiments of the present invention are elucidated in greater detail, with reference to the appended drawings.

BRIEF DESCRIPTION OF THE DRAWINGS

FIG. 9 shows a piston/spring system having pressure applied to it, a diagram in which a hydraulic force acting upon the piston is plotted against time.

FIG. 10 shows a diagram in which the piston speed and the frictional force resulting from the force curve of FIG. 9 are plotted over time.

FIG. 11 shows a diagram in which, among other things, a pressure controlled by the proportioning valve of FIG. 1 is plotted against a drive current not having asymmetrical dither.

FIG. 12 shows a diagram similar to FIG. 11, but having asymmetrical dither.

DETAILED DESCRIPTION

Figure 1:
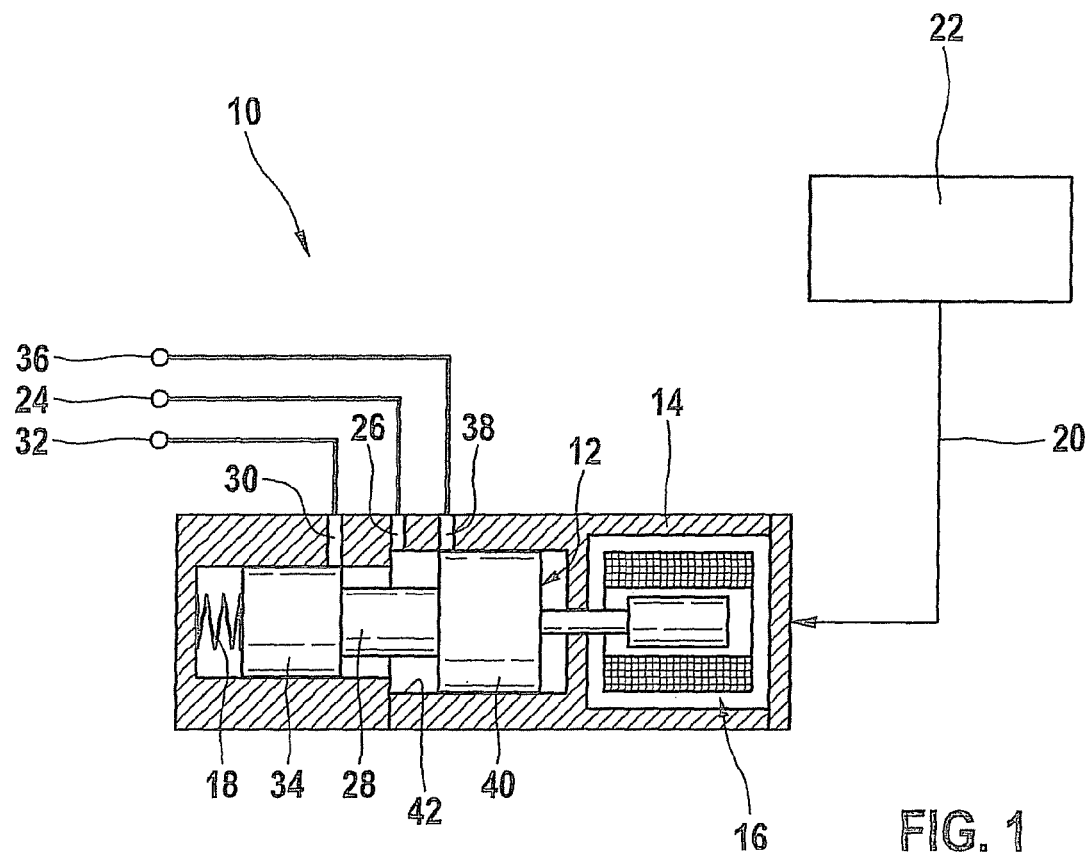
FIG. 1 shows a partial longitudinal section through a mechanical system which is formed by a proportioning valve, and includes as a movable component a slider-like valve element.

In FIG. 1, reference numeral 10 denotes a mechanical system as a whole that is developed as a proportioning valve. It includes a movable component in the form of a stepped valve slide 12, which is guided in a housing 14 in a sliding fit and is thus movable relative to housing 14 under friction. Proportioning valve 10 also includes an electromagnetic operating device 16, which acts upon valve slide 12 in the one direction, and a valve spring 18, which acts upon valve slide 12 in the other direction. Electromagnetic operating device 16 is controlled by a control signal 20, which is provided by an output stage (not shown) of a control and regulating device 22.

Proportioning valve 10, in this instance, is a pressure-regulating valve. Here, it regulates the pressure at a regulating connection 24, which is connected to a housing duct 26 that is located approximately at the level of a middle section 28 of valve slide 12, that has a comparatively small diameter. A second housing duct 30 is connected to a supply connection 32, at which there is a comparatively high supply pressure. Housing duct 30 works together with a control edge (that does not have a reference numeral), which is formed between a left section 34 in FIG. 1, which has a middle diameter, of valve slide 12 and middle section 28. A return line connection 36 is connected to a third housing duct 38 which collaborates with a control edge (that has no reference numeral), which is formed between middle section 28 and a right section 40 of valve slide 12, shown in FIG. 1, that has a comparatively large diameter. While the two sections 34 and 40 are guided under friction against an inner wall surface 42 of housing 14, there is an annular space (without reference numeral) between wall surface 42 and middle section 28 of valve slide 12.

Because section 40 has a larger diameter than section 34 of valve slide 12, the control pressure prevailing in the annular space between middle section 28 and housing 14 leads to a force directed to the right, in FIG. 1, against electromagnetic operating device 16, which is additive to the force that is exerted by valve spring 18 on valve slide 12. Depending on the force that is exerted by electromagnetic operating device 16 on valve slide 12, a force equilibrium sets in at valve slide 12 that has a corresponding control pressure at control regulating pressure connection 24. If the pressure drops at regulating pressure connection 24, valve slide 12 in FIG. 1 moves to the left, and if the regulating pressure rises, it moves to the right in FIG. 1.

In order for valve slide 12 to be able to move from one position into another, if valve slide 12 is standing absolutely still, the static friction between valve slide 12 and wall surface 42 of housing 14 must first be overcome. During the motion, a frictional force directed against the motion acts upon valve slide 12, because of the sliding friction that is then setting in. Even this, without countermeasures, would lead to no clear regulating pressure being assigned to a certain force exerted by electromagnetic operating device 16 on valve slide 12, that is, a clear hysteresis in the relationship between the control current of electromagnetic operating device 16 and the regulating pressure.

Therefore, in proportioning valve 10 shown here, an oscillating micromotion is impressed upon valve slide 12 by an appropriate control of electromagnetic operating device 16, as will be explained in detail below. Because of this oscillating micromotion, valve slide 12 is held perpetually in sliding friction with respect to wall surface 42 of housing 14. This oscillating micromotion is also called "dither".

Figure 2:
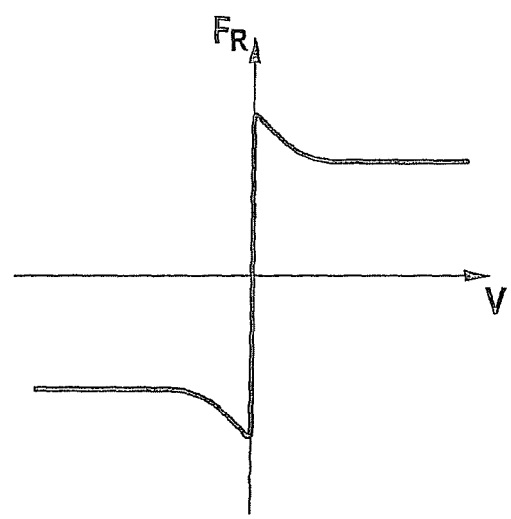
FIG. 2 shows a force/speed diagram to demonstrate a Stribeck curve in the range up to mixed friction.
Figure 3:
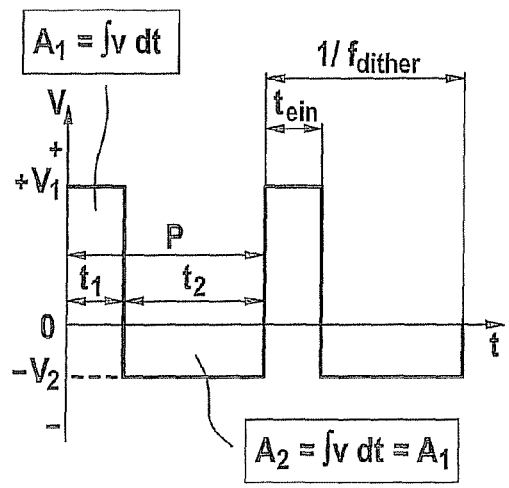
FIG. 3 shows a diagram in which a theoretical speed of the valve element of FIG. 1 is plotted over time upon impressing a first asymmetrical dither.

In a manner different from that of usual mechanical systems, in the case of proportioning valve 10 a so-called "asymmetrical dither" is used, however, in connection with which a well known physical mathematical relationship also known as a "Stribeck curve" is utilized. Such a Stribeck curve is shown in FIG. 2. One may see that between two components of a mechanical system, which are able to be moved with respect to each other under friction, a frictional force $F_R$ acts, that is a function of a relative speed V. In this context, in many material pairings, frictional force $F_R$ is greater at a speed V that is near zero than at a greater speed V. Beginning at a certain speed V, the frictional force is essentially constant, that is, essentially independent of speed V. This physical circumstance is used in proportioning valve 10 to generate a directed frictional force $F_R$. To do this, an electromagnetic operating device 16 is controlled in such a way that, in one period of oscillation, the oscillating micromotion of valve slide 12 is faster in one direction and of shorter duration (frictional force acts briefly) than in the opposite direction (frictional force acts for a long time). This asymmetrical micromotion is also designated as "asymmetrical dither". A first example of such an asymmetrical dither is shown in FIGS. 3 and 4:

One may see in FIG. 3 that within a period P of the oscillating micromotion, speed V is first positive and then negative. Absolute quantity $|V_1|$ at positive speed is more than twice as great as absolute quantity $|V_2|$ of the negative speed. At the same time, one may see that time period $t_1$, during which valve slide 12 has a positive speed $+V_1$, is clearly smaller than time period $t_2$, during which valve slide 12 has a negative speed $-V_2$. It may also be seen that the integral $A_1$ of speed V of the micromotion over time t within period P of the oscillation in the one direction (positive speed) is equal to the corresponding integral $A_2$ in the other direction (negative speed).

Figure 4:
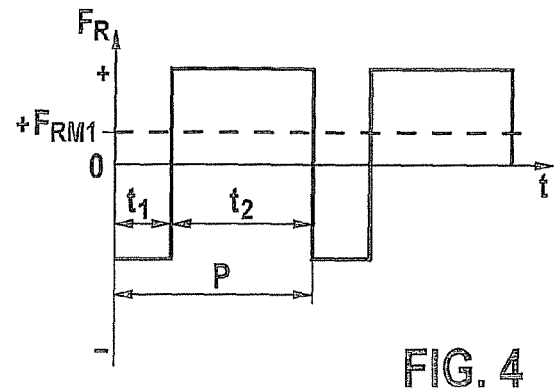
FIG. 4 shows a diagram in which a frictional force generated by the asymmetrical dither of FIG. 3 is plotted over time.

In the case of an oscillating micromotion of valve slide 12 corresponding to FIG. 3, a curve is yielded of frictional force $F_R$ over time, and this is plotted in FIG. 4. One may see that the frictional forces acting in the positive direction and in the negative direction are approximately equal in absolute value, but the frictional force acting in the positive direction acts during longer time period $t_2$, and the frictional force acting in the negative direction acts only during the shorter time period $t_1$. If one forms an average over time over a period P of the curve of frictional force $F_R$, one obtains an average directed positive frictional force having an absolute value $F_{RM1}$, shown in FIG. 4 as a dashed line.

Figure 5:
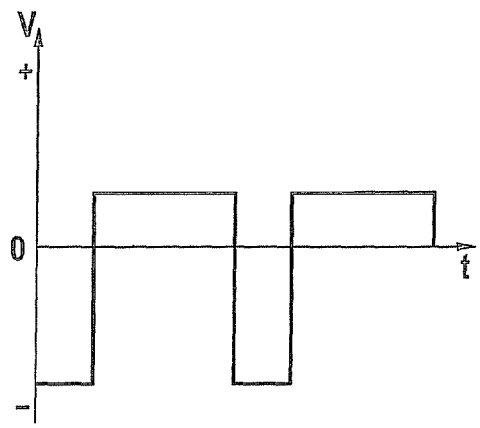
FIG. 5 shows a diagram similar to FIG. 3 for a second asymmetrical dither, which is directed opposite to the asymmetrical dither of FIG. 3.
Figure 6:
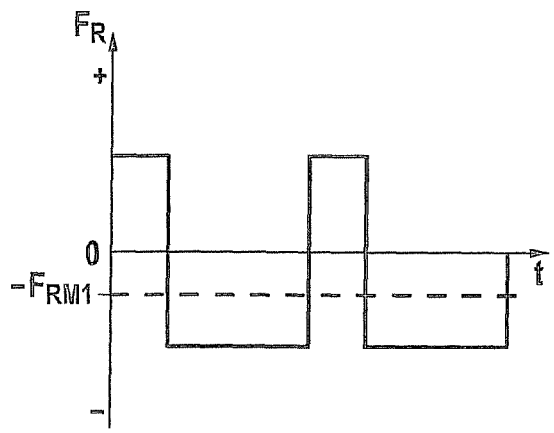
FIG. 6 shows a diagram similar to FIG. 4 for the asymmetrical dither of FIG. 5.
Figure 7:
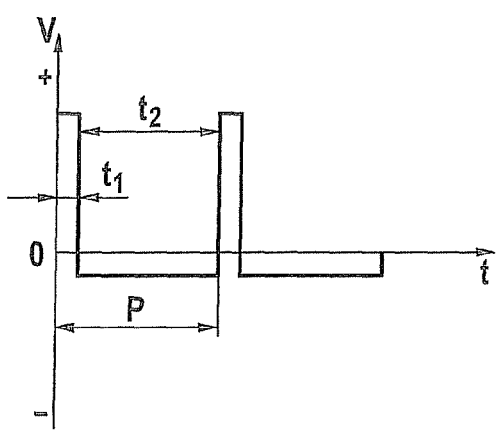
FIG. 7 shows a diagram similar to FIG. 3 for a third asymmetrical dither, having a different ratio of speed in the one direction to the speed in the other direction and other time parameters than in FIG. 3.
Figure 8:
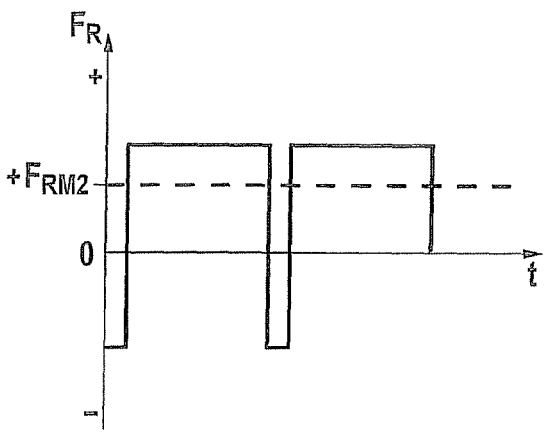
FIG. 8 shows a diagram similar to FIG. 4 for the asymmetrical dither of FIG. 7.

As may be seen in FIGS. 5 and 6, the direction of frictional force $F_R$ is able to be inverted by taking the mirror image of the speed curve at the time axis, so that a negative average directed frictional force $F_{RM1}$ comes about. The absolute quantity of the average directed frictional force $F_{RM}$ may above all be set by the ratio of time period $t_1$, during which the oscillating micromotion has a positive speed, to time period $t_2$, during which the oscillating micromotion has a negative speed. This may be seen in FIGS. 7 and 8, an average directed positive frictional force of quantity $+F_{RM2}$ coming about because of the oscillating micromotion according to FIG. 7. Or, in other words (cf. FIG. 3): the quantity of frictional force $F_R$ may be adjusted by the ratio, also designated as "duty cycle", of an "on" portion $t_1$ of the high level of a control signal generating the oscillating micromotion of FIG. 3, to the reciprocal value $1/f_{dither}$ (the dither frequency).

In proportioning valve 10 shown in FIG. 1, both the absolute quantity and the direction of the average directed frictional force $F_R$, that is generated by the asymmetrical dither, are a function of a current operating variable of proportioning valve 10, namely, of the absolute quantity of a control current of electromagnetic operating device 16, that brings about the base motion or the base position of valve slide 12, and of the sign of the gradient of the control current activating the base motion.

In FIGS. 3 to 8, idealized curves were shown of speed V over time t and corresponding idealized curves of frictional force $F_R$ over time t. In one real piston/spring system having pressure acting upon it, in which an oscillating pressure oscillation is impressed upon a hydraulic system acting upon the piston, which leads to an asymmetrical dither at the piston, the relationships shown in FIGS. 9 and 10 come about: In FIG. 9, the pressure oscillation or force oscillation acting on such a piston is denoted by 44, and the pressure average or force average resulting from this is denoted by 46. Because of pressure oscillation or force oscillation 44, the piston also oscillates corresponding to the pressure curve designated in FIG. 10 by 48. It will be seen that a positive speed is present only during a comparatively short time period $t_1$, whereas a negative speed V is present during a comparatively long time period $t_2$. Corresponding to this, a curve comes about of frictional force $F_R$ as is shown by curve 50. Short force peaks are detected in this instance, which are created in response to the zero crossing of the speed, according to the Stribeck curve. Averaged over a period P, an average positive frictional force comes about.

In proportioning valve 10 shown in FIG. 1, an oscillating component is accumulated together with a setpoint value of the control current of electromagnetic operating device 16, which generates a desired asymmetrical dither. Because integrals $A_1$ and $A_2$ are at least approximately equal, the actual current signal causing the motion or positioning of valve slide 12 by the asymmetrical dither is not disturbed or influenced, on average. Therefore, one may also say that the asymmetrical dither is "free of average value". Consequently, the average value of control signal 20 of electromagnetic operating device 16 is able to continue to be used as a reference variable for the motion or the positioning of valve slide 12 of proportioning valve 10.

In FIGS. 11 and 12, the curve of regulating pressure $P_R$ of proportioning valve 10 is plotted against an average control current I, in FIG. 11 the relationship being shown in response to a symmetrical dither, and in FIG. 12 the relationship being shown in response to an asymmetrical dither. One may see that a residual hysteresis H, that is clearly visible in FIG. 11, almost completely disappears in FIG. 12, when the asymmetrical dither is used.

Figure 13:
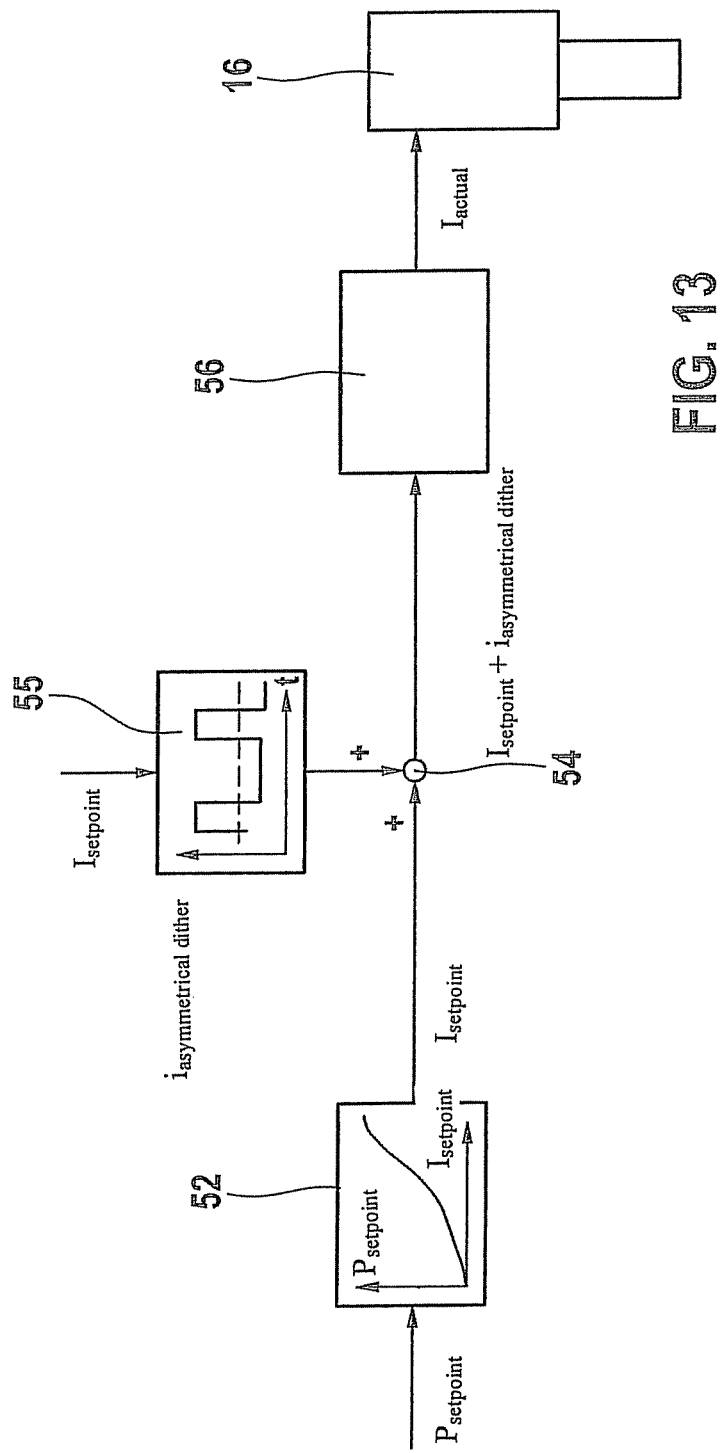
FIG. 13 a block diagram to explain a method for operating the proportioning valve of FIG. 1.

FIG. 13 shows a block diagram which reveals how control current $I_{actual}$ is finally generated from a setpoint value $P_{setpoint}$ for regulating pressure $P_R$: Pressure specification $P_{setpoint}$ is first fed into a current characteristics curve 52, which depicts the mechanical, hydraulic and electrical relationships of proportioning valve 10. At the output of characteristics curve 52 one obtains a setpoint current $I_{setpoint}$ corresponding to desired pressure $P_{setpoint}$. In an additive linkage point 54, setpoint current $I_{setpoint}$ has added to it a current signal $i_{asyDith}$ that is oscillating and asymmetrical within the meaning of asymmetrical dither. Asymmetrically oscillating current signal $i_{asyDith}$ is generated in a parameterization block 55 in such a way that a frictional force $F_R$ that is desirable with respect to absolute value and direction is generated on valve slide 12, as was shown above. The parameterization of parameterization block 55 complies with the actual requirements of proportioning valve 10, in this case, and with its current operating state, for example, the setpoint control current and/or setpoint regulating pressure $P_{setpoint}$, and the current gradient of the setpoint control current and/or setpoint regulating pressure $P_R$. Total current ($I_{setpoint}+i_{asyDith}$) resulting from this is fed to an output stage of control and regulating device 22, which emits a corresponding oscillating control current $I_{actual}$, which is supplied to electromagnetic operating device 16.

What is claimed is:

1. A method for operating a pressure regulating valve having a valve element, the method comprising:
   supplying a control current to an electromagnetic operating device;
   moving the valve element with the electromagnetic operating device to regulate the pressure at a regulating connection of the pressure regulating valve;
   impressing on the valve element an oscillating micromotion;
   wherein the oscillating micromotion comprises at least a first period of oscillation and a second period of oscillation, wherein the second period of oscillation immediately follows the first period of oscillation;
   wherein the oscillating micromotion includes movement in a first direction at a first speed during a first time duration within the first and the second period of oscillation, and movement in a second direction at a second speed during a second time duration within the the first and the second period of oscillation;
   wherein the first speed is greater than the second speed and the first time duration is shorter than the second time duration, resulting in an asymmetrical dither; and
   wherein an integral of a first speed of the oscillating micromotion or of a corresponding control variable over a first time duration within the first and the second period of oscillation in the first direction is at least approximately equal in absolute value to an integral of a second speed of the oscillating micromotion or of a corresponding control variable over a second time duration within the first and the second period of oscillation in the second directions;
   obtaining an average directed frictional force resulting from the asymmetrical dither during each of the first and the second period of oscillation; and
   using the average directed frictional force to avoid or at least to reduce a hysteresis in the relationship between the control current and the pressure at the regulating connection of the pressure regulating valve.

2. The method of claim 1, wherein an absolute value of a frictional force, which is generated by the asymmetrical dither, is a function of at least one of a current setpoint operating variable and a current actual operating variable of the mechanical system.

3. The method of claim 1, wherein a direction of a frictional force, which is generated by the asymmetrical dither, is a function of at least one of a current setpoint operating variable and a current actual operating variable of the mechanical system.

4. The method of claim 1, wherein the asymmetrical dither is generated by a rectangular control signal.

5. A non-transitory computer readable medium having a computer program, which is executable by a processor, comprising:
   a program code arrangement having program code for operating a pressure regulating valve having a valve element, by performing the following:
   supplying a control current to an electromagnetic operating device;
   moving the valve element with the electromagnetic operating device to regulate the pressure at a regulating connection of the pressure regulating valve;
   impressing on the valve element an oscillating micromotion;
   wherein the oscillating micromotion comprises at least a first period of oscillation and a second period of oscillation, wherein the second period of oscillation immediately follows the first period of oscillation;
   wherein the oscillating micromotion includes movement in a first direction at a first speed during a first time duration within the first and the second period of oscillation, and movement in a second direction at a second speed during a second time duration within the the first and the second period of oscillation, wherein the first speed is greater than the second speed and the first time duration is shorter than the second time duration, resulting in an asymmetrical dither; and
   wherein an integral of a first speed of the oscillating micromotion or of a corresponding control variable over a first time duration within the first and the second period of oscillation in the first direction is at least approximately equal in absolute value to an integral of a second speed of the oscillating micromotion or of a corresponding control variable over a second time duration within the first and the second period of oscillation in the second direction;
   obtaining an average directed frictional force resulting from the asymmetrical dither during each of the first and the second period of oscillation; and
   using the average directed frictional force to avoid or at least to reduce a hysteresis in the relationship between the control current and the pressure at the regulating connection of the pressure regulating valve.

6. The method of claim 5, wherein the pressure regulating valve is a proportioning valve.

7. A control regulating device for a pressure regulating valve having a component, comprising:
   a processing arrangement having a non-transitory computer readable medium having a computer program, which is executable by a processor, including:
   a program code arrangement having program code for operating a pressure regulating valve having a valve element, by performing the following:
   supplying a control current to an electromagnetic operating device;
   moving the valve element with the electromagnetic operating device to regulate the pressure at a regulating connection of the pressure regulating valve;
   impressing on the valve element an oscillating micromotion;

wherein the oscillating micromotion comprises at least a first period of oscillation and a second period of oscillation, wherein the second period of oscillation immediately follows the first period of oscillation;

wherein the oscillating micromotion includes movement in a first direction at a first speed during a first time duration within the first and the second period of oscillation, and movement in a second direction at a second speed during a second time duration within the the first and the second period of oscillation, wherein the first speed is greater than the second speed and the first time duration is shorter than the second time duration, resulting in an asymmetrical dither; and wherein an integral of a first speed of the oscillating micromotion or of a corresponding control variable over a first time duration within the first and the second period of oscillation in the first direction is at least approximately equal in absolute value to an integral of a second speed of the oscillating micromotion or of a corresponding control variable over a second time duration within the first and the second period of oscillation in the second direction;

obtaining an average directed frictional force resulting from the asymmetrical dither during each of the first and the second period of oscillation; and using the average directed frictional force to avoid or at least to reduce a hysteresis in the relationship between the control current and the pressure at the regulating connection of the pressure regulating valve.

\* \* \* \* \*